United States Patent
Jones

(10) Patent No.: US 9,067,804 B2
(45) Date of Patent: Jun. 30, 2015

(54) SOLAR POWERED WATER PURIFICATION CANTEEN

(71) Applicant: Thomas L. Jones, Clover, SC (US)

(72) Inventor: Thomas L. Jones, Clover, SC (US)

(*) Notice: Subject to any disclaimer, the term of this patent is extended or adjusted under 35 U.S.C. 154(b) by 380 days.

(21) Appl. No.: 13/649,360

(22) Filed: Oct. 11, 2012

(65) Prior Publication Data

US 2014/0102965 A1 Apr. 17, 2014

(51) Int. Cl.
| | | |
|---|---|---|
| C02F 1/32 | (2006.01) | |
| C02F 1/00 | (2006.01) | |
| C02F 1/02 | (2006.01) | |
| C02F 9/00 | (2006.01) | |
| A45F 3/16 | (2006.01) | |
| C02F 1/28 | (2006.01) | |

(52) U.S. Cl.
CPC . C02F 1/002 (2013.01); C02F 1/32 (2013.01); C02F 1/02 (2013.01); C02F 2303/04 (2013.01); A45F 2003/163 (2013.01); C02F 9/005 (2013.01); C02F 1/283 (2013.01); C02F 1/325 (2013.01); C02F 2201/009 (2013.01); C02F 2201/3222 (2013.01); C02F 2307/02 (2013.01)

(58) Field of Classification Search
None
See application file for complete search history.

(56) References Cited

U.S. PATENT DOCUMENTS

| | | | |
|---|---|---|---|
| 4,696,284 A | | 9/1987 | Stowell |
| 4,880,535 A | * | 11/1989 | Burrows ................. 210/181 |
| 5,106,495 A | | 4/1992 | Hughes |
| 5,628,897 A | | 5/1997 | Phelan |
| 6,180,003 B1 | | 1/2001 | Reber et al. |
| 6,595,280 B2 | * | 7/2003 | Traylor ................. 166/105.5 |
| 6,863,827 B2 | | 3/2005 | Saraceno |
| 7,226,536 B2 | | 6/2007 | Adams |
| 7,257,951 B2 | | 8/2007 | Xing |
| 7,390,417 B2 | | 6/2008 | Kuhlmann et al. |
| 7,641,790 B2 | * | 1/2010 | Maiden ................. 210/91 |
| 2003/0164333 A1 | * | 9/2003 | Nohren et al. ........... 210/650 |
| 2006/0163169 A1 | * | 7/2006 | Eckhardt et al. ........ 210/748 |
| 2006/0266690 A1 | | 11/2006 | Adams |
| 2007/0272550 A1 | * | 11/2007 | Shiue et al. ............. 204/267 |
| 2011/0031171 A1 | | 2/2011 | Henig |
| 2012/0279927 A1 | * | 11/2012 | Husson, Jr. ............ 210/748.09 |
| 2013/0075312 A1 | * | 3/2013 | Ervin ................. 210/138 |

* cited by examiner

*Primary Examiner* — Terry Cecil
(74) *Attorney, Agent, or Firm* — Hammer & Associates, P.C.

(57) ABSTRACT

A solar powered water purification canteen includes a container, UV LED lights and a solar power panel. The container is adapted to hold a fluid and has a reservoir, an inlet and an outlet. The UV LED lights are around the reservoir and are adapted to kill any bacteria from fluid in the reservoir. The solar power panel is positioned on the outside of the container adapted to power the UV LED lights.

1 Claim, 5 Drawing Sheets

SOLAR POWERED WATER PURIFICATION CANTEEN

FIELD OF INVENTION

The instant application relates to the combination of a water purification device and a portable fluid container like a canteen, and more particularly, to a solar powered water purification canteen.

BACKGROUND OF THE INVENTION

Water purification, or the process of removing undesirable chemicals, biological contaminants, suspended solids and gases from contaminated water, is used to provide water fit for human consumption, also known as potable water or drinking water. Known methods used to purify water include physical processes (i.e. filtration), sedimentation, and distillation, biological processes (i.e. slow sand filters or biologically active carbon), chemical processes (i.e. flocculation and chlorination) and the use of electromagnetic radiation such as ultraviolet ("UV") light. Water purification may lower the concentration of particulates, like suspended particles, bacteria, parasites, fungi, algae, viruses, and an assortment of dissolved and particulate matter resulting from the environment.

Visual examination of natural water present in the environment is not enough to determine if the water is potable. Thus, there is clearly a need for water treatment systems or devices for purifying natural occurring water to make it drinkable. The broad field of water treatment systems includes two classes of equipment, a point of entry device or system and a point of use device or system. Point of entry equipment treats water before distribution through a community or a building and typically utilizes microfiltration, chlorination, and/or ozonation technologies to remove and/or kill various contaminants in water. On the other hand, point of use equipment treats water at its source of consumption or use. The instant invention is directed toward a point of use device useful for treating and purifying water from a source prior to use, as may be required to treat natural water in the environment.

Point of use water treatment systems have become ever more popular as more individuals become concerned about the water they use and drink. However, these systems are limited to utilization at a specific location (e.g. at an individual's place of residence), and hence are not amenable to portable use. The need for portable water treatment systems for providing potable water at remote locations is important. This requirement exists, for example, in rural areas where potable water supply is not readily available, like on a camping trip or trips to under developed land or countries. Similarly, portable water systems are often required in the aftermath of disasters such as earthquakes and tropical storms where the local water supply has been contaminated or disrupted. In these situations, some effective method of treating local water becomes necessary.

Many water purification systems use power to be effective. A power source is not always available in remote areas and it becomes inconvenient to carry a power source such as a generator or even batteries to those locations. It is desirable to have a built-in system that provides practically limitless power while also being small enough to be incorporated in to a small package.

In cases where a person is in jeopardy of hyperthermia or hypothermia, it may be necessary to cool or heat the person's internal system. An effective way of doing this is to ingest cooled or warmed liquid. With a thermal-electric plate the water in the canteen may be cooled or warmed to a sufficient level, regardless of the temperature of the water that is taken in to the canteen, to aid in the person's recovery from the given condition.

A point of use portable water purification system must be effective to purify the water and to remove particulates, inorganic materials and hydrocarbons. In addition to these requirements, it is desirable that a point of use portable water purification system must be simple and convenient to use. It is also desirable that such a portable water purification system not require the addition of chemicals and the like to be added to the water which either may lessen the quality of the treated water and/or require additional supplies. Another requirement for a point of use portable water purification device is that it be compact and light weight, thereby making it portable. Thus, it is desired that the device must be capable of being carried empty or without water, for instance as part of the gear needed for hiking or camping, and then utilized when a source of water is found, thus relieving the camper, hiker, transport person, or the like, of the need to carry the weight of the water.

The instant invention is designed to provide a solar powered water purification canteen that addresses at least some of the problems mentioned above.

SUMMARY OF THE INVENTION

The instant invention includes a solar powered water purification canteen. The solar powered water purification canteen includes a container, particulate filter, power storage system, thermoelectric cooler/heater, UV LED lights and a solar power panel. The container is adapted to hold a fluid and has a two stage reservoir, an inlet and an outlet. The particulate filter is in the upper section of the reservoir and the UV LED lights are positioned around the lower section of the reservoir and are adapted to kill any bacteria from fluid in the reservoir. The solar power panel is positioned on the outside of the container adapted to power the UV LED lights.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
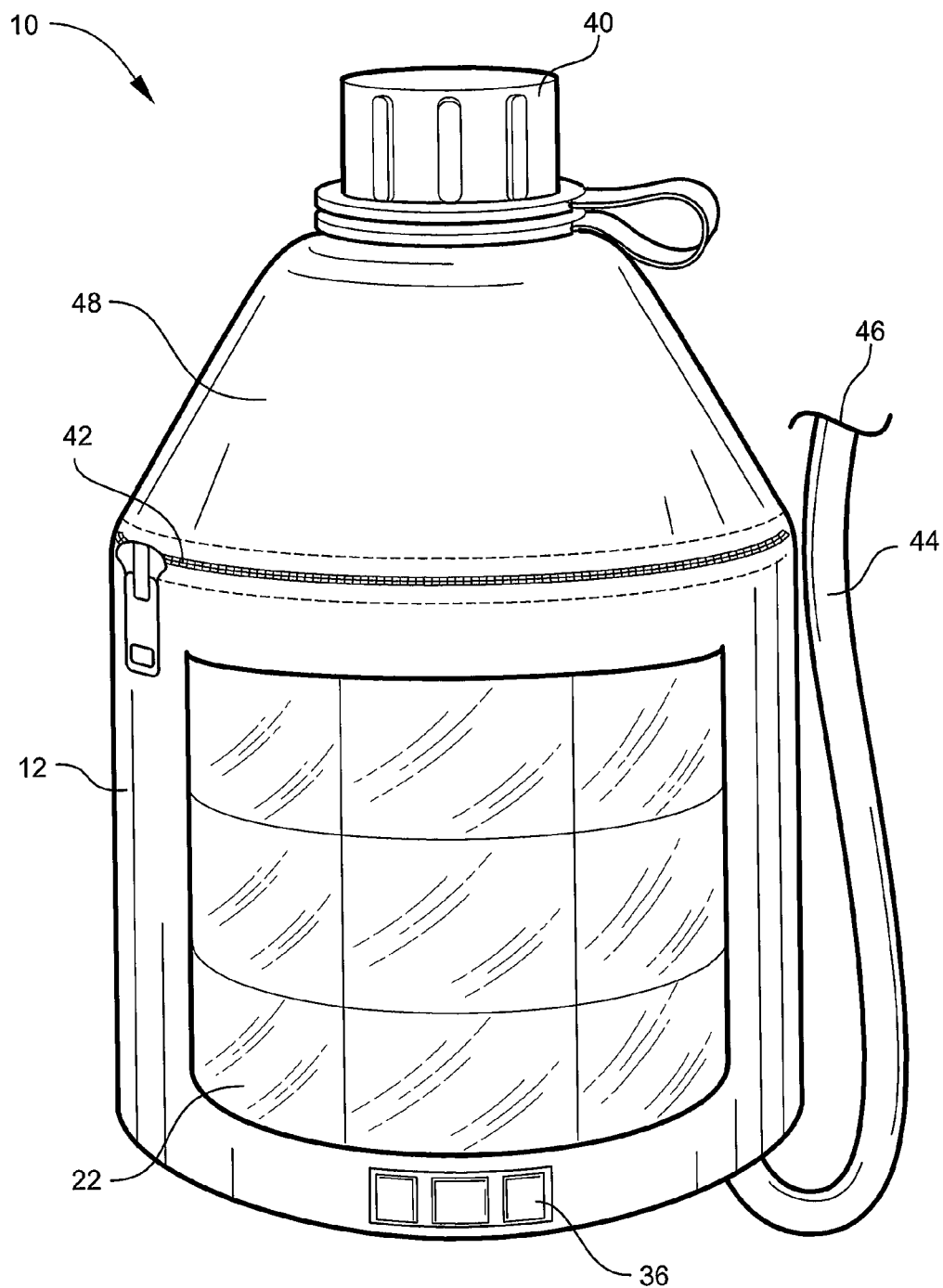
FIG. 1 is a perspective view of one embodiment of a solar powered water purification canteen according to the instant invention.
Figure 2:
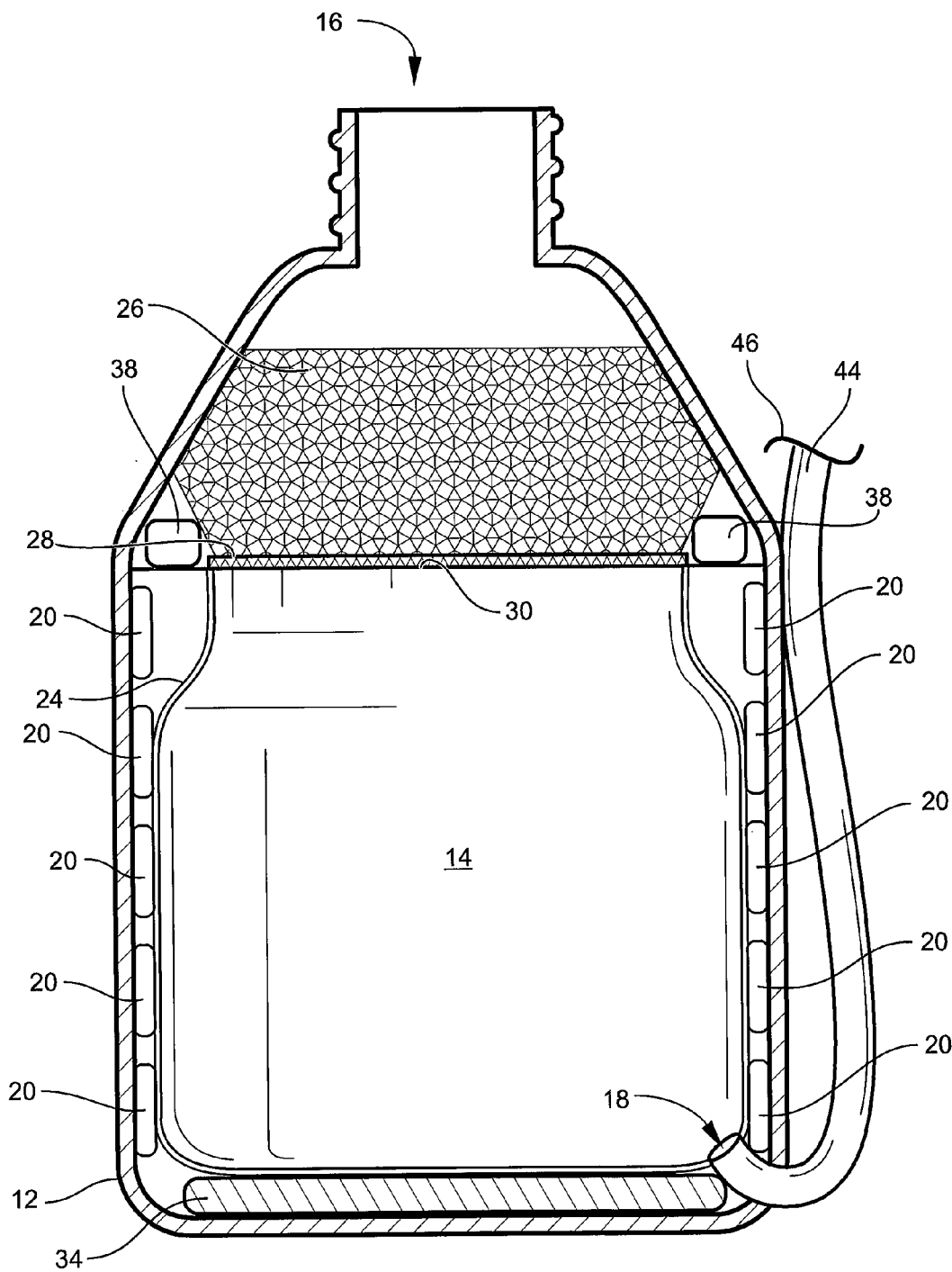
FIG. 2 is a cross-sectional view of one embodiment of a solar powered water purification canteen according to the instant invention.
Figure 3:
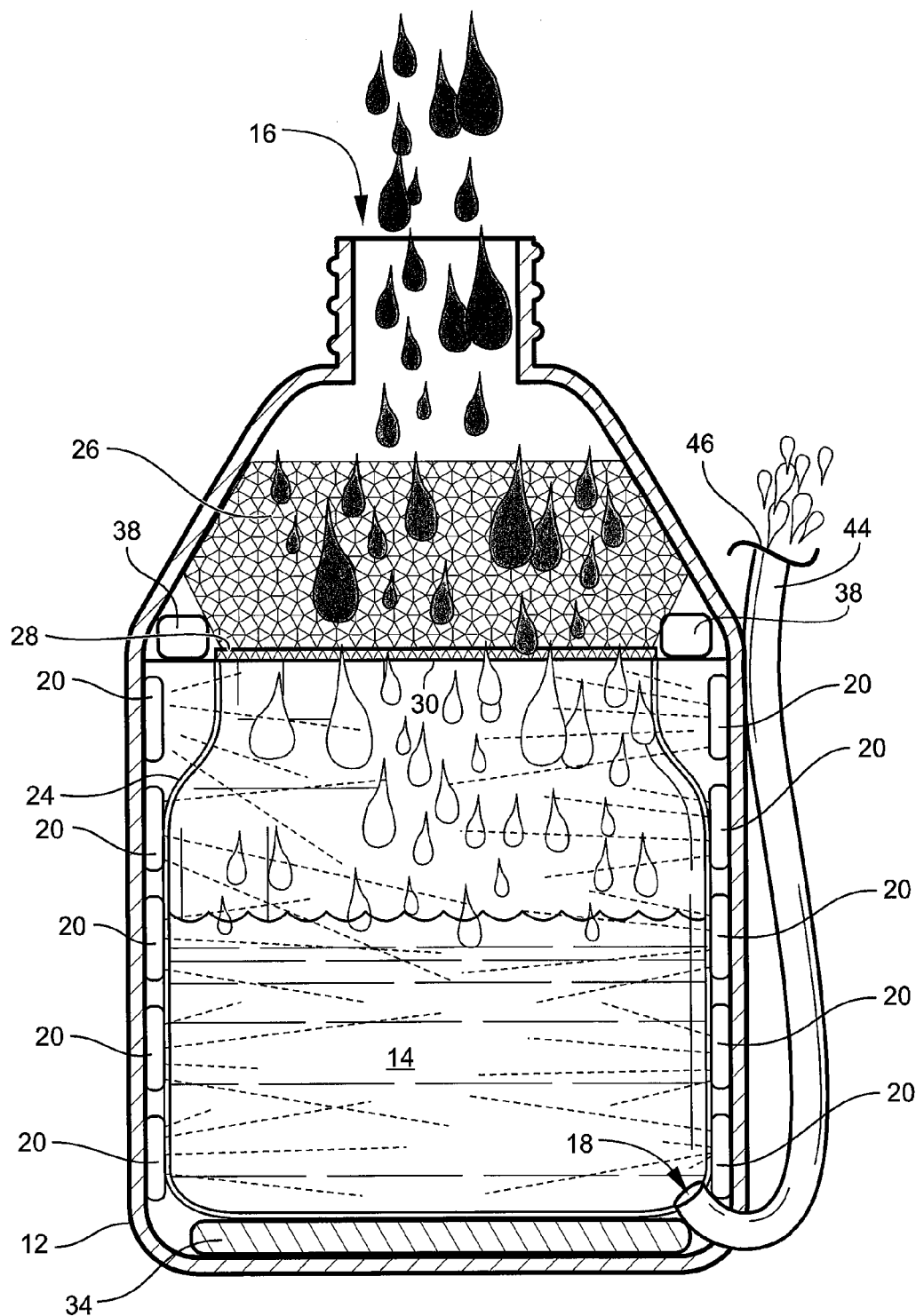
FIG. 3 is a cross-sectional view with a schematic diagram of the water purification process of the solar powered water purification canteen shown in FIG. 2.

Referring to the drawings, wherein like numerals indicate like elements, there is shown in FIGS. 1-3 various embodiments of a solar powered water purification canteen 10. Solar powered canteen 10 may be a point of use portable water purification device. Solar powered canteen 10 may be utilized for purifying an amount of water for providing safe drinkable water, i.e. potable water. Solar powered canteen 10 may be effective to purify the water and to remove particulates, inorganic materials and hydrocarbons. Solar powered canteen 10 may be utilized as a point of use portable water purification system that is simple and convenient to use. Solar powered water purification canteen 10 may be effective to purify water without the need for chemicals and the like to be added to the water. Canteen 10 may be any size or shape, but is desirable to be compact and light weight. In addition, canteen 10 is designed to be capable of being carried empty or without water to a site of naturally occurring water, where the canteen may be filled and the water may be purified in a short amount of time.

Solar powered water purification canteen 10 generally includes a container 12, UV LED lights 20 (ultraviolet light emitting diodes), and a solar power panel 22. See FIGS. 1-3. These parts will be described in greater detail below.

Container 12 may be included in solar powered water purification canteen 10. See FIGS. 1-3. Container 12 may be adapted for holding a fluid. Container 12 may be any size or shaped container adapted for holding a fluid. Container 12 may have a reservoir 14, an inlet 16, and an outlet 18. Reservoir 14 may be the area in container 12 adapted to store a fluid. Reservoir 14 may be any size or shape reservoir in container 12. Reservoir 14 may be for separating the fluid inside container 14 from the UV LED lights 20 and other components or features of canteen 10. Reservoir 14 may be made of any material capable of allowing UV rays from the UV LED lights 20 to penetrate through into the fluid inside. In one embodiment, reservoir 14 may be made of a clear liner material 24. Inlet 16 may be an opening in container 12 where fluid may enter into reservoir 14. Inlet 16 may be positioned anywhere on container 12, including, but not limited to, at the top of container 12. Positioning inlet 16 at the top may allow gravity to be utilized in moving water through the filtration and purification processes in canteen 10. Outlet 18 may be another opening in container 12 where fluid may exit out of reservoir 14. Outlet 18 may be positioned anywhere on container 12, including, but not limited to, at the bottom of container 12. Positioning outlet 18 at the bottom may allow gravity to be utilized for dispensing the purified water out of canteen 10. Outlet 18 may be in the form of a drinking tube, a check valve diaphragm that opens when the soft body of the canteen is squeezed sufficiently thus allowing the water to flow out, a simple twist-on cap covered opening (similar to a canteen opening), a twist-on cap covered opening that also acts as a drinking cup or any similar configurations that facilitate drinking the purified water.

UV LED lights 20 may be included in solar powered canteen 10. See FIGS. 2 and 3. UV LED lights 20 may be for purifying fluid or water inside reservoir 14. UV LED lights 20 may be adapted to purify the fluid inside reservoir 14 by emitting ultraviolet light and purifying the water with electromagnetic radiation. UV LED lights 20 may be any lights that emit ultraviolet light and are capable of being powered by a solar panel. Thus, although the instant invention is directed to the use of LED lights, other ultraviolet or UV lights, known or developed in the future, capable of being powered by solar power panel 22 may also be used and are thus incorporated herein as a part of the definition of UV LED lights 20. UV light, or ultraviolet light, as used herein is electromagnetic radiation with a wavelength shorter than that of visible light, but longer than X-rays, that is, in the range 10 nm to 400 nm, corresponding to photon energies from 3 eV to 124 eV. LEDs are known to be manufactured to emit light in the ultraviolet range, although most LED arrays are very limited below 365 nm. LED efficiency at 365 nm is currently known to be about 5-8%, whereas efficiency at 395 nm is closer to 20%, and power outputs at these longer UV wavelengths are also better. However, such LED arrays are beginning to be used for UV applications. Power densities approaching 3,000 mW/cm2 (30 kW/m2) are now possible, and this, coupled with more efficient solar power panels and energy storage make the instant invention possible. UV lights 20 may be positioned anywhere inside container 12 adapted to kill bacteria from fluid in reservoir 14. In one embodiment, as shown in FIGS. 2 and 3, UV lights 20 may be radially spaced around reservoir 14. The amount of UV lights 20 required may depend on the type of UV lights used, the material of reservoir 14, and the time required for treatment of solar powered canteen 10.

Solar power panel 22 may be included in solar powered water purification canteen 10. See FIG. 1. Solar power panel 22 may be for providing power to solar powered canteen 10. Solar power panel 22 may power UV LED lights 20, or any other UV or other lights provided in solar powered canteen 10. Solar power panel 22 may also power any other electronic devices on canteen 10, including, but not limited to, a thermoelectric plate 34, switch plate 36, water exit valve 46, or any other electric devices. Solar power panel 22 may be any sized or shaped solar power panel capable of powering solar powered water purification canteen 10. As used herein, solar power panel refers to a solar panel, a solar module, a photovoltaic module, photovoltaic panel, or the like, or any other packaged, connected assembly of photovoltaic cells that use light energy (photons) from the sun to generate electricity through the photovoltaic effect. The majority of known solar power panels use wafer-based crystalline silicon cells or thin-film cells based on cadmium telluride or silicon. The conducting wires that take the current off the panels may contain silver, copper or other non-magnetic conductive transition metals. The cells of the solar power panel 22 may be connected electrically to one another and to the rest of the system by any means. The cells of the solar power panel 22 may also be protected from mechanical damage and moisture by any means. In one embodiment, solar power panel 20 may be semi-flexible (semi-flexible panels typically based on thin-film cells). For example, this semi-flexible embodiment of solar power panel 20 may be used on a flexible embodiment of container 12, thereby providing a flexible embodiment of canteen 10. In another embodiment, solar power panel 20 may be rigid. For example, this rigid embodiment of solar power panel 20 may be used on a rigid embodiment of container 12, thereby providing a rigid embodiment of canteen 10.

A charcoal filter layer 26 may be included in solar powered water purification canteen 10. See FIGS. 2 and 3. Charcoal filter layer 26 may be for filtering the fluid or water as it enters inlet 16. Charcoal filter layer 26, as used herein, may refer to any carbon type filter or the like. Carbon filters have been used for several hundred years and are considered one of the oldest means of water purification. Currently, carbon filters are used in individual homes as point-of-use water filters, groundwater remediation and, occasionally, in municipal water treatment facilities. Thus, carbon filtering is a known method of filtering that may use a piece of activated carbon to remove contaminants and impurities, utilizing chemical adsorption. The carbon, or the charcoal of charcoal filter layer 26, may be activated with a positive charge that may be designed to attract negatively charged water contaminants. The charcoal filter layer 26 may remove any contaminants, including, but not limited to, chlorine, sediment, and volatile organic compounds (VOCs) from water. Typical particle sizes that can be removed by carbon filters range from 0.5 to 50 micrometers and the particle size may be used as part of the filter description. The efficacy of a carbon filter is also based upon the flow rate regulation. When the water is allowed to flow through the filter at a slower rate, the contaminants are exposed to the filter media for a longer amount of time. A secondary media, for example, like silver or KDF-55, may be included with the charcoal filter layer 26 to prevent bacteria growth within the filter.

A one way flow device 28 may be included in solar powered water purification canteen 10 between charcoal filter layer 26 and reservoir 14. One way flow device 28 may be for allowing water to flow from charcoal filter layer 26 to reservoir 14 but not from reservoir 14 to charcoal filter layer 26. One way flow device 28 may control the speed of flow through charcoal filter layer 26 into reservoir 14 and may also prevent treated water from reservoir 14 to enter back into charcoal filter layer 26. One way flow device 28 may be any type of device, film, valve, membrane, etc. capable of producing one way flow of fluid from charcoal filter layer 26 to reservoir 14. In one embodiment, one way flow device 28 may be a semi-permeable membrane 30. Semi-permeable membrane 30 may be adapted to allow one way water flow from charcoal filter layer 26 into reservoir 14. Semi-permeable membrane 30 may be any membrane capable of producing one way flow from charcoal filter layer 26 into reservoir 14.

Figure 4:
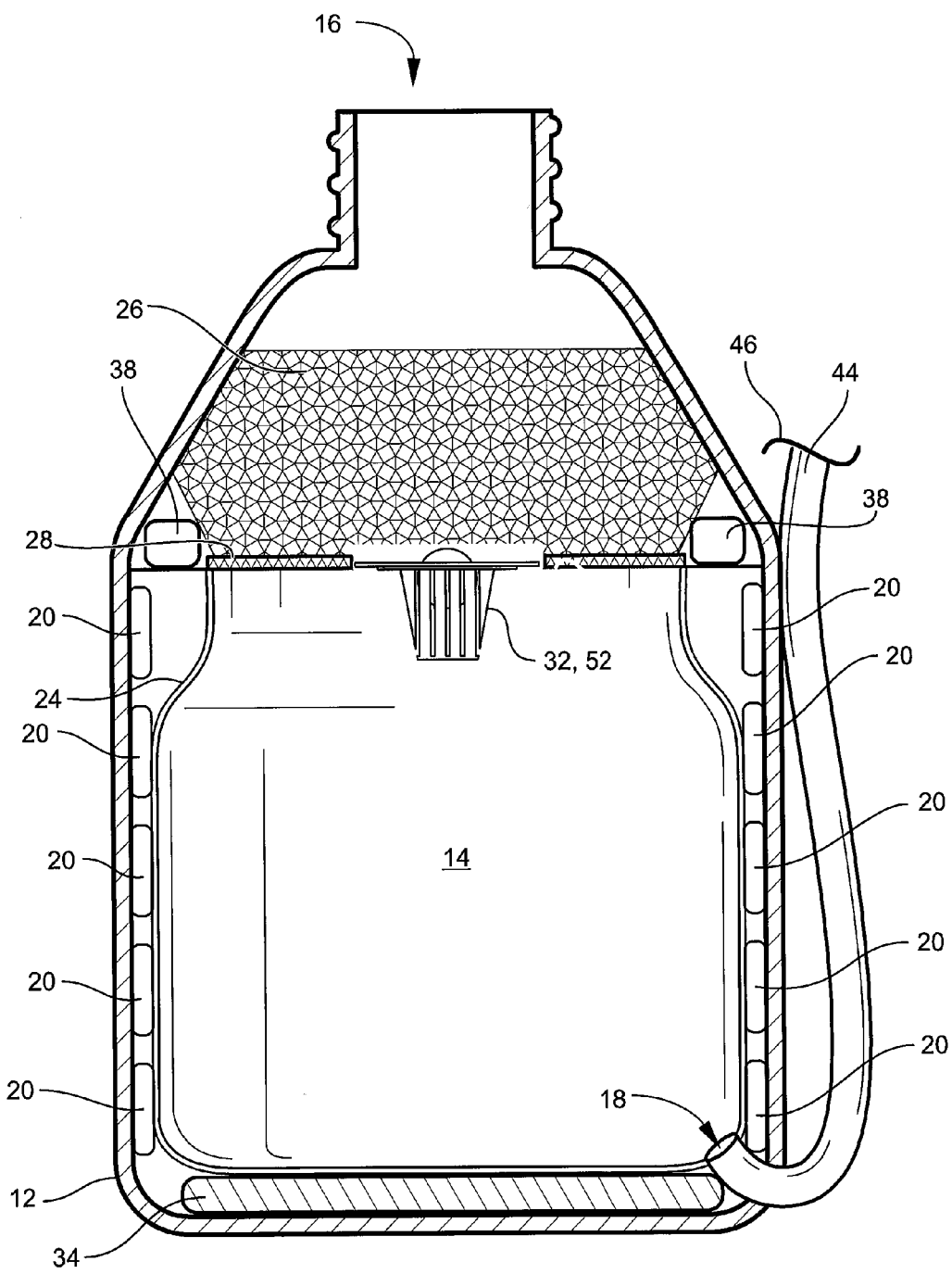
FIG. 4 is a cross-sectional view of another embodiment of a solar powered water purification canteen according to the instant invention.

In another embodiment, one way flow device 28 may be a check valve 32. See FIG. 4. Check valve 32 may be positioned between charcoal filter layer 26 and reservoir 14 and may be adapted to allow one way water flow from charcoal filter layer 26 into reservoir 14. Check valve 32 may be any type of valve or fitting capable of producing one way flow from charcoal filter layer 26 into reservoir 14. For example, check valve 32 may be a ball float valve 52 as shown in FIG. 4. The ball float valve 52 may be any standard ball float valve or other like devices for providing one way flow of a liquid. Ball float valve 52 may have a ball with a larger diameter than the opening. Below the ball is a cage that is just big enough to allow the ball to move away from the opening. Thus, when the water is low in reservoir 14, the ball will move away from the opening, and when the water gets high enough, the ball will move into the opening, thereby sealing the flow through ball float valve 52.

A thermoelectric plate 34 may optionally be included in solar powered water purification canteen 10. See FIGS. 2 and 3. Thermoelectric plate 34 may be for heating and/or cooling the fluid or water in canteen 10. Thermoelectric plate 34 may be positioned anywhere in container 12. In one embodiment, thermoelectric plate 34 may be positioned at the bottom of container 12 adapted for heating and/or cooling the fluid in reservoir 14. Thermoelectric plate 34, as used herein, refers to a thermoelectric plate, Peltier cooling plate, a thermoelectric cooler (TEC) or other like devices. Thermoelectric plates take advantage of what is known as the Peltier effect to create a heat flux between the junction of two different types of materials, which is commonly used for cooling electronic components and small instruments. One advantage to thermoelectric plates is that there are no moving parts and such a device is maintenance free. Thermoelectric plate 34 may freeze to icy cold in just a matter of minutes, or alternatively, reverse the polarity and heat to a boiling point. In one embodiment, thermoelectric plate 34 may have an electrified metal plate that utilize electricity and generates a heat pump. Thermoelectric plate 34 may be capable of generating electricity when one side is kept cool and heat is applied to the other. The advantages to providing thermoelectric plate in solar powered canteen 10 for heating and/or cooling the fluid or water include, but are not limited to: no moving internal parts to damage when in transit, makes absolutely no noise and does not vibrate, long life, slim and compact, and can be fully sealed for protection against moisture. Thermoelectric plate 34 may be powered by any power source included in canteen 10, including, but not limited to, solar power panel 22.

A switch plate 36 may be included in solar powered water purification canteen 10. See FIG. 1. Switch plate 36 may be for controlling the UV LED lights 20 (or any other lights) and/or the cooling/warming of thermoelectric plate 34. Switch plate 36 may also be adapted to control any other additional features added on to solar powered canteen 10. Switch plate 36 may include any known knobs and/or switches for controlling and regulating the functions of solar powered canteen 10.

A supercapacitor 38 may also be included in solar powered water purification canteen 10. Supercapacitor 38 may be for storing energy from solar power panel 22. Supercapacitor 38, as used herein, refers to an electric double-layer capacitor (EDLC), also known as supercondenser, electrochemical double layer capacitor, ultracapacitor, or the like whether known or discovered in the future. Supercapacitor 38 may be an electrochemical capacitor with relatively high energy density, which is typically hundreds of times greater than conventional electrolytic capacitors. Supercapacitor 38 may be used as an alternative to conventional energy storage systems such as lead acid batteries, nickel based battery technologies or lithium based battery technologies. However, the invention is not so limited, and other such energy storage systems and the like may be used, whether known, or developed in the future, including such examples as lead acid batteries, nickel based battery technologies or lithium based battery technologies.

A cap 40 may also be included in solar powered water purification canteen 10. See FIG. 1. Cap 40 may be for sealing the inlet 16 of container 12. Cap 40 may be any size, shape, or type of cap adapted to seal inlet 16. In one embodiment, as shown in the Figures, cap 40 may be a threaded cap. In this threaded embodiment, inlet 16 may include a threaded portion adapted to receive threaded cap 40.

A zippered top 42 may be included in solar powered water purification canteen 10. See FIG. 1. Zippered top 42 may be for providing access to the charcoal filter layer 26. In addition, zippered top 42 may be for accessing other internal components of the canteen, including, but not limited to, the battery compartment if conventional energy storage systems are in use and need replacement. Zippered top 42 may be any device for providing access to the charcoal filter layer 26, including, but not limited to a standard zipper. However, the invention is not so limited and other openings may also be utilized, including, but not limited to, Velcro, adhesive, tie string, the like, and combinations thereof.

A drinking tube 44 may also be included in solar powered water purification canteen 10. See FIGS. 1-3. Drinking tube 44 may be for providing a drinking tube on canteen 10 for dispensing the treated water in canteen 10. Drinking tube 44 may be provided anywhere on canteen 10. In one embodiment, drinking tube 44 may be connected to outlet 18 at the bottom of container 12. Positioning drinking tube 44 at the bottom of container 12 may allow gravity to be utilized for dispensing the purified water. Drinking tube 44 may be any size or shape drinking tube. In one embodiment, drinking tube 44 may include a water exit valve 46. Water exit valve 46 may be for controlling the water exiting drinking tube 44. Water exit valve 46 may control the water exiting drinking tube 44 by any means. In one embodiment, water exit valve 46 may be in communication with switch plate 36, whereby water exit valve 46 may be adapted to keep the user from drawing the water before it has been sufficiently purified, treated, irradiated, etc. with UV light in reservoir 14.

The container 12 of solar powered water purification canteen 10 may be made of any material suitable for a personal water container like a canteen. In one embodiment, container 12 may be made from a flexible material. In this flexible embodiment, solar power panel 22 may be flexible or semi-flexible and thereby conformable to flexible container 12. In one embodiment of the flexible container 12, the container 12 may include a squeezable top 48. The squeezable top 48 may be for forcing fluid through the charcoal filter layer 26 and one way flow device 28 into reservoir 14.

Figure 5:
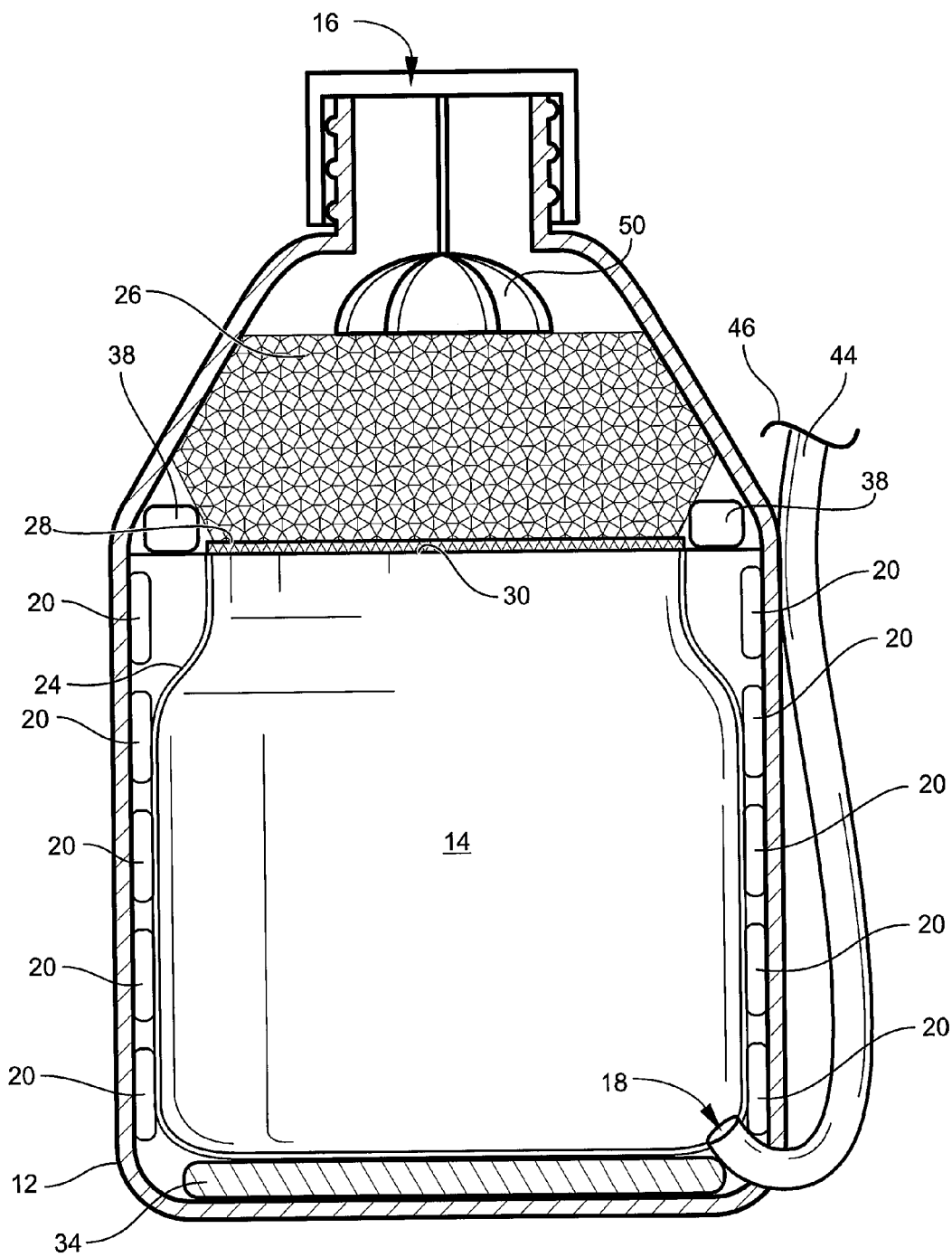
FIG. 5 is a cross-sectional view of yet another embodiment of a solar powered water purification canteen according to the instant invention.

In another embodiment, container 12 may be made from a rigid material. In this rigid embodiment of canteen 10, solar power panel 22 may be rigid, or semi-flexible or flexible. In one embodiment of the rigid canteen 10, a plunger 50 may be included. See FIG. 5. Plunger 50 may be for forcing fluid through charcoal filter layer 26 and one way flow device 28 into reservoir 14. The plunger 50 may be shaped to conform to the canteen top. Plunger 50 may include the threaded cap 16 with a rod extended onto a center boss. A threaded connected rod may connect the doomed plunger 50 to the cap 16. In one embodiment, the doomed plunger 50 may include exterior ribs to allow liquid to pass by when taking liquid in.

The instant invention also contemplates a solar powered water purification and heating/cooling canteen. This device is a solar powered canteen that is capable of both water purification and heating/cooling of the purified water. The solar powered water purification and heating/cooling canteen may include: container 12 adapted to hold a fluid having reservoir 14, inlet 16 and outlet 18; UV LED lights 20 around reservoir 14 adapted to kill any bacteria from fluid in reservoir 14; a thermoelectric plate 34 positioned at the bottom of reservoir 14 adapted for heating and/or cooling the fluid in reservoir 14; and a solar power panel 22 positioned on the outside of container 12 adapted to power UV LED lights 20 and thermoelectric plate 34. The solar powered water purification and heating/cooling canteen may also include any additional features as discussed above, including, but not limited to, the reservoir 14 being made of a clear liner material 24, the clear liner 24 being adapted to allow UV rays from UV LED lights 20 to enter reservoir 14; a charcoal filter layer 26 adapted to filter fluid as it enters inlet 16; a one way flow device 28 between charcoal filter layer 26 and reservoir 14 adapted to allow water to flow from charcoal filter layer 26 to reservoir 14 but not from reservoir 14 to charcoal filter layer 26; the one way flow device 28 being semi-permeable membrane 30, check valve 32, or other similar devices adapted to allow one way water flow from charcoal filter layer 26 into reservoir 14; a switch plate 36 adapted for controlling the UV LED lights 20, the cooling/warming of thermoelectric plate 34, and/or any other additional features; supercapacitor 38 adapted for storing energy from the solar power panel 22; cap 40 adapted to seal inlet 16; zippered top 42 adapted for accessing charcoal filter layer 26; or a drinking tube 44 connected to outlet 18 including water exit valve 46 adapted to control the water exiting drinking tube 44, where water exit valve 44 being in communication with switch plate 36, whereby the water exit valve 46 may be adapted to keep the user from drawing the water before it has been sufficiently purified with UV light.

The instant invention also contemplates a method of manufacturing a solar powered water purification canteen as described and shown herein.

The instant invention also contemplates a method of purifying water with a solar powered water purification canteen as shown and described herein. The method of purifying water may include, but is not limited to, the following steps: providing a solar powered water purification canteen as described herein; collecting energy through the solar power panel; inserting water into the inlet of said water purification canteen; moving water through the charcoal filter layer thereby carbon filtering the water; moving water from the charcoal filter layer through the one way flow device into the reservoir 14; purifying the water in reservoir 14 with ultra-violet lights (UV) from the UV LED lights; and removing water from reservoir 13 through outlet 18. As should be understood by one skilled in the art, the method of purifying water with solar powered water purification canteen 10 may include additional steps that may be gleaned from the description of solar powered water purification canteen 10 discussed herein.

The instant invention may be embodied in other forms without departing from the spirit and the essential attributes thereof, and, accordingly, reference should be made to the appended claims, rather than to the foregoing specification, as indicated in the scope of the invention.

I claim:

1. A solar powered water purification and heating/cooling canteen comprising:
    a container adapted to hold a fluid having a reservoir, an inlet and an outlet, said reservoir being made of a clear liner, said clear liner being adapted to allow UV rays from said UV LED lights to enter said reservoir;
    UV LED lights around said reservoir adapted to kill any bacteria from fluid in said reservoir;
    a thermoelectric plate positioned at the bottom of said reservoir adapted for heating and/or cooling the fluid in said reservoir;
    a solar power panel positioned on the outside of said container adapted to power said UV LED lights and said thermoelectric plate;
    a charcoal filter layer adapted to filter fluid as it enters said inlet;
    a one way flow device between said charcoal filter layer and said reservoir adapted to allow water to flow from said charcoal filter layer to said reservoir but not from said reservoir to said charcoal filter layer;
    said one way flow device being selected from the group consisting of: a semi-permeable membrane adapted to allow one way water flow from said charcoal filter layer into said reservoir; and a check valve between said charcoal filter layer and said reservoir adapted to allow one way water flow from said charcoal filter layer into said reservoir;
    a switch plate adapted for controlling the UV LED lights and/or the cooling/warming of said thermoelectric plate;
    a supercapacitor adapted for storing energy from said solar power panel;
    a cap adapted to seal said inlet;
    a zippered top adapted for accessing said charcoal filter layer; and
    a drinking tube connected to said outlet including a water exit valve adapted to control the water exiting said drinking tube;
    said water exit valve being in communication with said switch plate, whereby said water exit valve may be adapted to keep the user from drawing the water before it has been sufficiently irradiated with UV light.

* * * * *